(12) United States Patent
Rosaria et al.

(10) Patent No.: US 7,827,532 B2
(45) Date of Patent: *Nov. 2, 2010

(54) FINITE STATE MODEL-BASED TESTING USER INTERFACE

(75) Inventors: Steven Rosaria, Redmond, WA (US); Henry J. Robinson, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 1475 days.

This patent is subject to a terminal disclaimer.

(21) Appl. No.: 11/207,441

(22) Filed: Aug. 19, 2005

(65) Prior Publication Data

US 2006/0005170 A1    Jan. 5, 2006

Related U.S. Application Data

(63) Continuation of application No. 09/579,887, filed on May 26, 2000, now Pat. No. 6,976,246.

(51) Int. Cl.
    G06F 9/45    (2006.01)
(52) U.S. Cl. ...................................... 717/125
(58) Field of Classification Search .................. 717/125
    See application file for complete search history.

(56) References Cited

U.S. PATENT DOCUMENTS 5,394,347 A    2/1995    Kita et al.
5,870,590 A    2/1999    Kita et al.
6,038,378 A    3/2000    Kita et al.
6,044,211 A    3/2000    Jain
2002/0059411 A1    5/2002    Barnhouse
2002/0152102 A1    10/2002    Brodersen
2003/0182638 A1    9/2003    Gupta et al.

OTHER PUBLICATIONS

Gao et al., An Object State test Model . . . , ACM, 1995, p. 1-14.*
Robinson, "Finite State Model-Based Testing on a Shoestring", STAR West, 1999, pp. 1-10.
Robinson, "Graph Theory Techniques in Model-Based Testing", International Conference on Testing Computer Software, 1999, pp. 1-10.

* cited by examiner

*Primary Examiner*—John Chavis
(74) *Attorney, Agent, or Firm*—Lee & Hayes, PLLC

(57) ABSTRACT

A finite state model-based testing system has a user interface to enable a user to enter state information and transition information about a software application to be tested. The user interface further enables a user to initiate a model generation engine to generate a model of the software application from the state information and transition information. A graph traversal menu enables a user to select a graph traversal program to generate a test sequence of inputs for the software application from the model, and a test execution menu enables a user to select a test driver program to read the test sequence of inputs for the software application, and execute the test sequence of inputs on the software application.

11 Claims, 10 Drawing Sheets

FINITE STATE MODEL-BASED TESTING USER INTERFACE

RELATED APPLICATIONS

This application is a continuation of and claims priority to U.S. patent application Ser. No. 09/579,887 entitled "Finite State Model-Based Testing User Interface" filed May 26, 2000 to Rosaria et al., the disclosure of which is incorporated by reference herein.

BACKGROUND

Finite state model-based testing describes the behavior of a system (e.g., a software application) under test in terms of a finite state machine. Model-based testing generates software tests from explicit descriptions of an application's behavior. It is desirous to test software applications with a model-based utility because a model of an application is easily updated and is very adaptable to the changing conditions of a software application under test. As a software application evolves, static tests, such as a hard-coded program, have to be modified manually and recompiled whenever there is a change in the specification or functionality of the application. With model-based testing, the changes can be accounted for by simply changing the model. Furthermore, model-based testing enhances the quality of a software application by providing a means for a more accurate and thorough test.

The idea behind model-based testing is to establish a model for the behavior of the application under test. The behavior of the application is described through variables called "operational modes." Operational modes dictate when differing inputs are applicable and how an application will react when the inputs are applied under different operational configurations of the application. For example, whether or not an application is currently running is a common operational mode. Typically, if the application is not running, the only action that a user can execute is to start the application. If the application is running, however, a user typically has a choice of multiple actions that could be executed.

A state is a valid combination of values of the operational modes. All of the possible states for an application under test are compiled into a model which is represented by a finite state transition table. Each entry in a state table consists of a current state, an input that is executed, and a next state that describes the condition of the application after the input is applied.

A simplified example of a software application from Microsoft Corporation of Redmond, Wash. is discussed to illustrate defining a simple finite state model to test the application. FIG. 1 shows two possible displays within a Clock window 100 for a "Windows" Clock application: an analog display 102 and a digital display 104. The Clock window also shows a user selectable option, "Settings" 106. Selecting "Settings" initiates a menu (not shown) that enables a user to select either a "Digital" or "Analog" option which changes an analog display to a digital display and vice-versa.

In the simplified example of the Clock application, there are four possible system inputs: (1) Start the Clock application; (2) Stop the Clock application; (3) Select Analog setting; and (4) Select Digital setting.

There are three rules for each of the four possible system inputs. The rules for each system input are as follows:

(1) Start

If the application is not running, the user can execute the Start command.

If the application is running, the user cannot execute the Start command.

After the Start command executes, the application is running.

(2) Stop

If the application is not running, the user cannot execute the Stop command.

If the application is running, the user can execute the Stop command.

After the Stop command executes, the application is not running.

(3) Analog

If the application is not running, the user cannot execute the Analog command.

If the application is running, the user can execute the Analog command.

After the Analog command executes, the clock is an analog display.

(4) Digital

If the application is not running, the user cannot execute the Digital command.

If the application is running, the user can execute the Digital command.

After the Digital command executes, the clock is a digital display.

The Clock application example will have two operational modes: a system mode and a setting mode, each of which has associated values. The two operational modes and associated values are as follows:

System mode: {Running, Not_Running} to indicate whether the Clock application is running or not; and Setting mode: {Analog, Digital} to indicate the format of the clock display.

From the above Clock application inputs, rules for the application inputs, and the operational modes, a finite state model is defined from all of the possible state combinations of the application under test. Table 1 below shows the state table for testing the Clock application. The names of the current and next states appear as a combination of operational mode values separated by a period. For example, the state "Running.Digital" means that the Clock application is running and that the display is digital.

TABLE 1

| Current State | Application Input | Next State |
| --- | --- | --- |
| Not_Running.Analog | Start | Running.Analog |
| Not_Running.Digital | Start | Running.Digital |
| Running.Analog | Stop | Not_Running.Analog |
| Running.Digital | Stop | Not_Running.Digital |
| Running.Analog | Analog | Running.Analog |
| Running.Analog | Digital | Running.Digital |
| Running.Digital | Analog | Running.Analog |
| Running.Digital | Digital | Running.Digital |

Developing a model is an incremental process that requires simultaneously taking into consideration many aspects of an application under test. State model-based testing is cumbersome and tedious to implement for even a relatively simple software application when attempting to define a model for the application. As the state space increases for a large and complex application (i.e., the increasing number of possible states for an application under development), the model becomes increasingly burdensome to define. This is known as "state explosion". It is unrealistic to create and maintain a model for an application by hand.

Continuing with the example of the Clock application, the model defined by the state table shown in Table 1 above can be graphically represented. FIG. 2 shows a state transition diagram 200 for the Clock model. The circles 202-208 are nodes that represent the application states and the arrows are links that represent the application inputs 210-224. The direction of the arrows indicate an application input being applied to a current state of the application at the start of an arrow and the resultant next state at the end of the arrow. For example, a "Start" application input 210 applied to the current state "Not_Running.Analog" 202 results in a next state of "Running.Analog" 204.

The Clock application model defined by the state table shown above in Table 1 is analyzed by a graph traversal algorithm to develop a path, which is a test sequence, of the application inputs to be applied to the application under test in a particular order. Graph traversal algorithms are stand-alone programs that read in a state transition table from a file and follow a path through the model according to some traversal algorithm. Path segments for a model are graphically represented in the state transition diagram 200 illustrated in FIG. 2. Moving from one application state (i.e., nodes 202-208) to another following an application input (i.e., arrow links 210-224) is a path, or a segment of one.

Graph traversal algorithms are well known and can be implemented to provide random sequenced paths, minimal duplication paths, or other optimized variations of path sequences. The result of analyzing the Clock application model with a graph traversal algorithm to find an optimal testing sequence is shown in Table 2 below. The testing sequence traverses every application input in the state model as efficiently as possible. That is to say, the generated test sequence analyzes every application input (i.e., arrow links 210-224) with every associated application state (i.e., nodes 202-208) in the fewest number of link traversals as possible. For clarity, the Table 2 entries are labeled with the corresponding reference numbers from FIG. 2.

TABLE 2

| Test Sequence | Application Input | | Next Application State | |
|---|---|---|---|---|
| 1 | Start | (210) | Running.Analog | (204) |
| 2 | Analog | (212) | Running.Analog | (204) |
| 3 | Digital | (214) | Running.Digital | (206) |
| 4 | Digital | (216) | Running.Digital | (206) |
| 5 | Stop | (218) | Not_Running.Digital | (208) |
| 6 | Start | (220) | Running.Digital | (206) |
| 7 | Analog | (222) | Running.Analog | (204) |
| 8 | Stop | (224) | Not_Running.Analog | (202) |

The test sequence generated by a graph traversal algorithm, shown above in Table 2, is applied to a test driver that executes the test sequence on the software application under test. A test driver is a stand-alone program that reads a test sequence from a file (e.g., test_sequence.txt) and initiates testing code that can apply the test sequence to an application under test. The testing code runs the application as if a user was manipulating the application's user-selectable inputs.

"Visual Test" has existing functions that can be called upon by a test driver to implement the testing code for an application test sequence. Table 3 below lists some examples of such functions that would be associated with developing the testing code for the Clock application example.

TABLE 3

| Functions | Description of Function |
|---|---|
| Run("C:\WINNT\System32\clock.exe") | Starts the Clock application |
| WMenuSelect("Settings\Analog") | Selects "Analog" on the "Settings" menu |
| WSysMenu( 0 ) | Invokes "System" menu for the active window |
| WFndWnd("Clock") | Finds a window with "Clock" caption |
| WMenuChecked("Settings\Analog") | Returns "True" if "Analog" is check marked |
| GetText(0) | Returns the window title of the active window |

An example of programming code implemented by a test driver to test the first two actions in the test sequence for the Clock application example, "Start" and "Analog", is shown below. The test execution program would read "Start" from the test_sequence.txt file and execute the Visual Test function Run("C:\WINNT\System32\clock.exe") associated with the "Start" action. The program would then read "Analog" from the file and execute the WMenuSelect("Settings\Analog") function associated with the "Analog" function.

```
open "test_sequence.txt" for        'get the list of actions
input as #infile
while not (EOF(infile))
    line input #infile, action      'read in an action
    select case action
        case "Start"                'start the Clock
        run("C:\WINNT\System32\     'VT call to start Clock program
        clock.exe")
        case "Analog"               'choose analog mode
        WMenuSelect("Settings\      'VT call to select menu item Analog
        Analog")
        case "Digital"              'choose digital mode
        WMenuSelect("Settings\      'VT call to select menu item Digital
        Digital")
        case "Stop"                 'stop the Clock
        WSysMenu (0)                'VT call to bring up system menu
        WMenuSelect ("Close")       'VT call to select menu item Close
    End select
    Test_oracle( )                  'analyze Clock behavior
wend
```

After all of the actions in the test program have been executed, a test oracle function (Test_oracle( ) in the above programming code) can be called to determine if the application behaved as the model expected. A test oracle is a mechanism that verifies if the application has executed correctly. Another one of the benefits of model-based testing is the ability to create a test oracle from the state model. In the case of the simple Clock model example, a test oracle can verify whether the Clock is running or not, and whether the display is in an Analog or Digital mode.

The inventors have developed a system testing interface that provides a user with an easy to use interface to develop and generate a model for a software application under test, initiate the development of a test sequence with a graph traversal algorithm, and initiate the generation of a test execution program to test the application.

SUMMARY

A finite state model-based testing system enables a user to define and generate a model for testing a software application, and to initiate a test of the software application. A system testing interface has a graphical user interface and a model generation engine to implement a model-based testing tool that solves the problem of a user having to define all of the possible states for a software application under test when developing a model for the software application.

The user interface enables a user to define a state table and the associated software application transitions in terms of simple user-defined rules. From the user-defined rules, the model generation engine generates the entire model (i.e., state table) of the software application under test. The state table is generated when the model generation engine calculates and develops all of the possible operational mode value combinations for the software application, and for each permutation, determines which software application inputs are applicable.

After the model of the software application under test is generated, the testing interface enables a user to select a graph traversal program that generates a test sequence of inputs for the software application from the model. The testing interface also enables a user to initiate a test of the application by selecting a test driver program that executes the test sequence of inputs on the software application.

BRIEF DESCRIPTION OF THE DRAWINGS

The same numbers are used throughout the drawings to reference like features and components.

DETAILED DESCRIPTION

Figure 1:
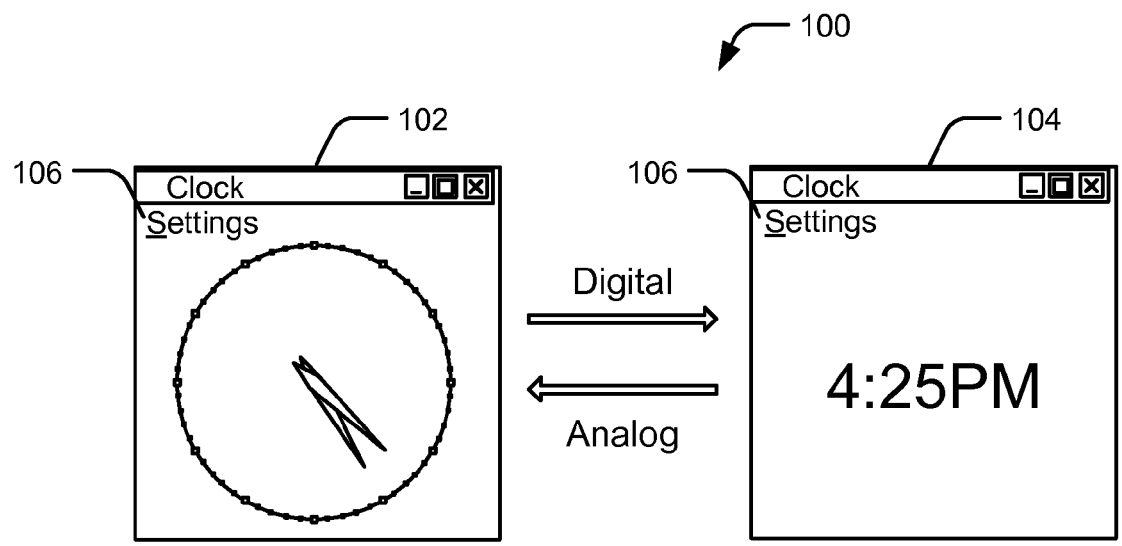
FIG. 1 shows two displays of a software application that is used as an example to illustrate a conventional approach to defining a simple finite state model for the application.
Figure 2:
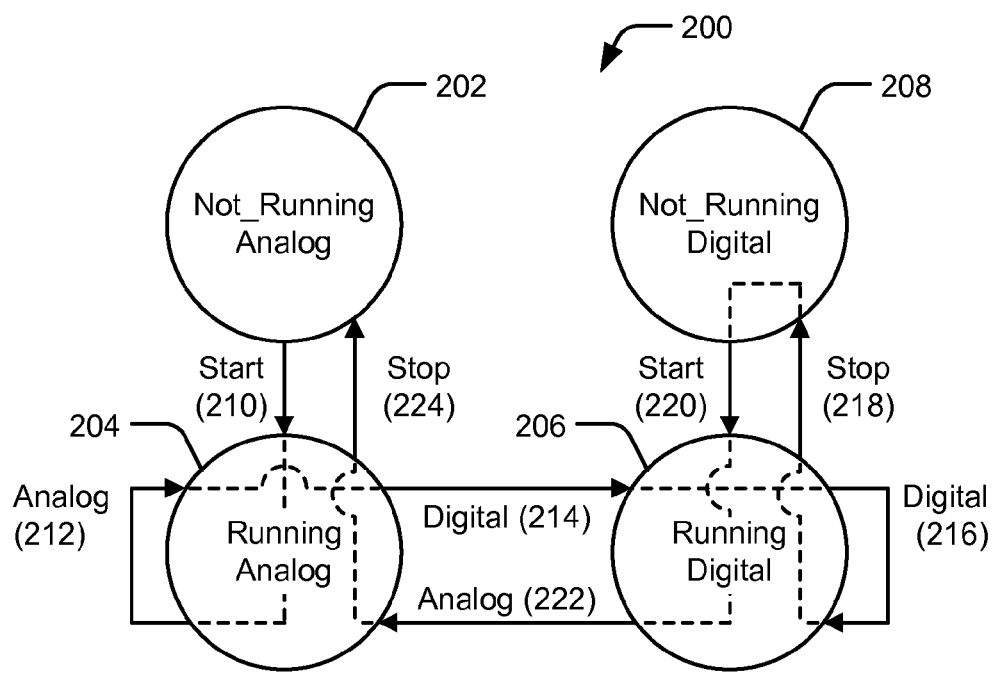
FIG. 2 shows a conventional state transition diagram for the example application shown in FIG. 1.
Figure 3:
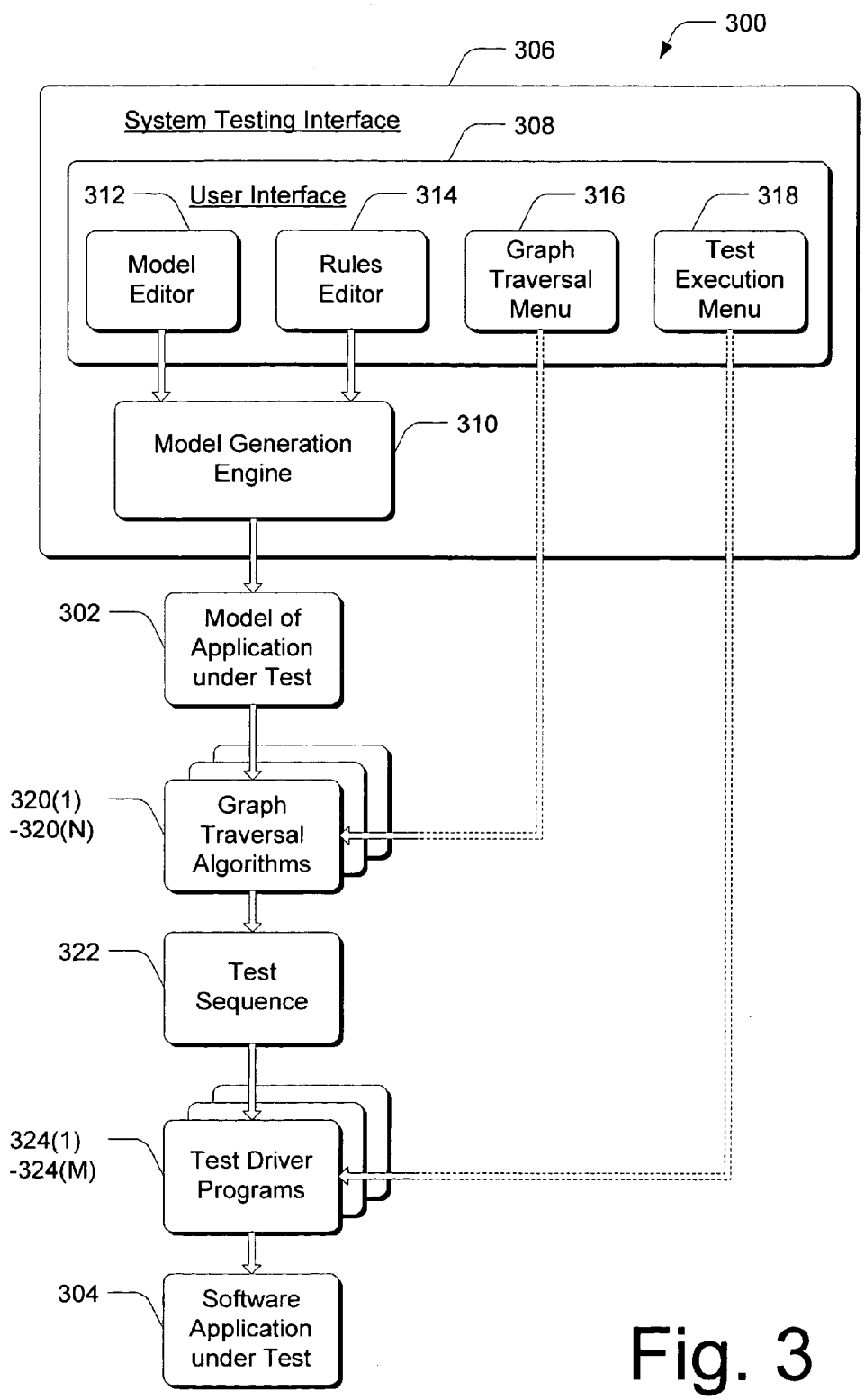
FIG. 3 is a block diagram that illustrates a finite state model-based testing system.

FIG. 3 illustrates a finite state model-based testing system 300 which enables a user to define and generate a model 302 for testing a software application 304, and to initiate a test of the application 304. Software applications are used in the examples throughout this disclosure to illustrate the finite state model-based testing system 300. Testing system 300 need not be limited to testing software applications, however.

A model 302 can be defined and generated with testing system 300 for any computer executable instructions, to include sub-sets of a software application's instructions, any device that can execute computer readable instructions, or any other device that receives user or device generated inputs either directly or remotely, such as via a programmable logic unit hard-wired to a device, or via such technologies as infrared.

Testing system 300 has a system testing interface 306 that enables a user to define a software application under test in terms of simple user-defined rules. The system testing interface 306 is a model-based testing tool that solves the problem of a user having to define all of the possible states for a software application under test when implementing a model 302 for the application.

The system testing interface 306 has a graphical user interface 308 and a model generation engine 310. From the user-defined rules, the model generation engine 310 generates a model 302 of the software application 304. A model of a software application is a state table having multiple state table entries that consist of a current state of the software application, an input of the application, and a next state of the application. The next state of an application indicates the state of the application after the input has been applied to the current state of the application.

The graphical user interface 308 has a model editor 312, a rules editor 314, a graph traversal menu 316, and a test execution menu 318, all of which are independently displayable graphical user interfaces. The specifics of each user interface display are described below in conjunction with FIGS. 6, 8, 10, and 11, respectively. The model editor 312 and rules editor 314 enable a user to enter parameters to define the model 302 of the software application 304. The graph traversal menu 316 and test execution menu 318 enable a user to initiate a test of the software application 304.

The model editor 312 enables a user to enter parameters pertaining to state information about the software application 304. The state information includes operational modes of the application, modal values associated with the operational modes of the application, and inputs to the application. Inputs to a software application can be from a user selection device (e.g., a mouse, a keyboard, a joystick, etc.), or from any other system, device, or application. An "operational mode" is an attribute of a particular state of the software application, and through operational modes, the behavior of the application is described. A "modal value" is associated with a particular operational mode and defines the application behavior described by the operational mode. An application "state" is a valid combination of the modal values of the operational modes of a particular application, and the application can have as many states as there are valid combinations of modal values for the particular software application.

The rules editor 314 enables a user to enter the parameters pertaining to transition information about the software application 304. The transition information includes a current state of the application which is associated with an input of the application, and a next state of the application. As described above, the next state of an application indicates the state of the application after the input has been applied to the current state of the application. A transition rule is defined by the current state, the input of the application, and the next state.

The model generation engine 310 generates the model 302 (i.e., state table) of the software application 304 by determining all of the possible modal value combinations associated with the application operational modes. For each permutation, the model generation engine 310 determines which application inputs are applicable to a current state of the application, where the current state is defined by particular operational modes and associated modal values. In the event that an input can be applied to the current state, the model generation engine 310 writes a state table entry out to the state table, where the state table entry includes the current state, the input, and the next state of the software application.

The graph traversal menu 316 enables a user to select from among multiple graph traversal algorithms 320(1)-320(N) and to generate a test sequence of application inputs 322 to test the software application 304 in a particular order of application inputs. Graph traversal algorithms are stand-alone programs that read in a state transition table (i.e., a model) from a file and follow a path through the model according to some traversal algorithm. FIG. 3 illustrates that the graph traversal menu 316 is the user interface to initiate the graph traversal algorithms 320(1)-320(N). The test sequence of inputs 322 is generated from the model 302 with a particular graph traversal algorithm 320.

The test execution menu 318 enables a user to select from among multiple test driver programs 324(1)-324(M) and to initiate a test of the software application 304. FIG. 3 illustrates that the test execution menu 318 is the user interface to initiate the test driver programs 324(1)-324(M). The test driver programs 324(1)-324(M) read in the test sequence of inputs 322 and execute the inputs on the software application under test 304.

Figure 4:
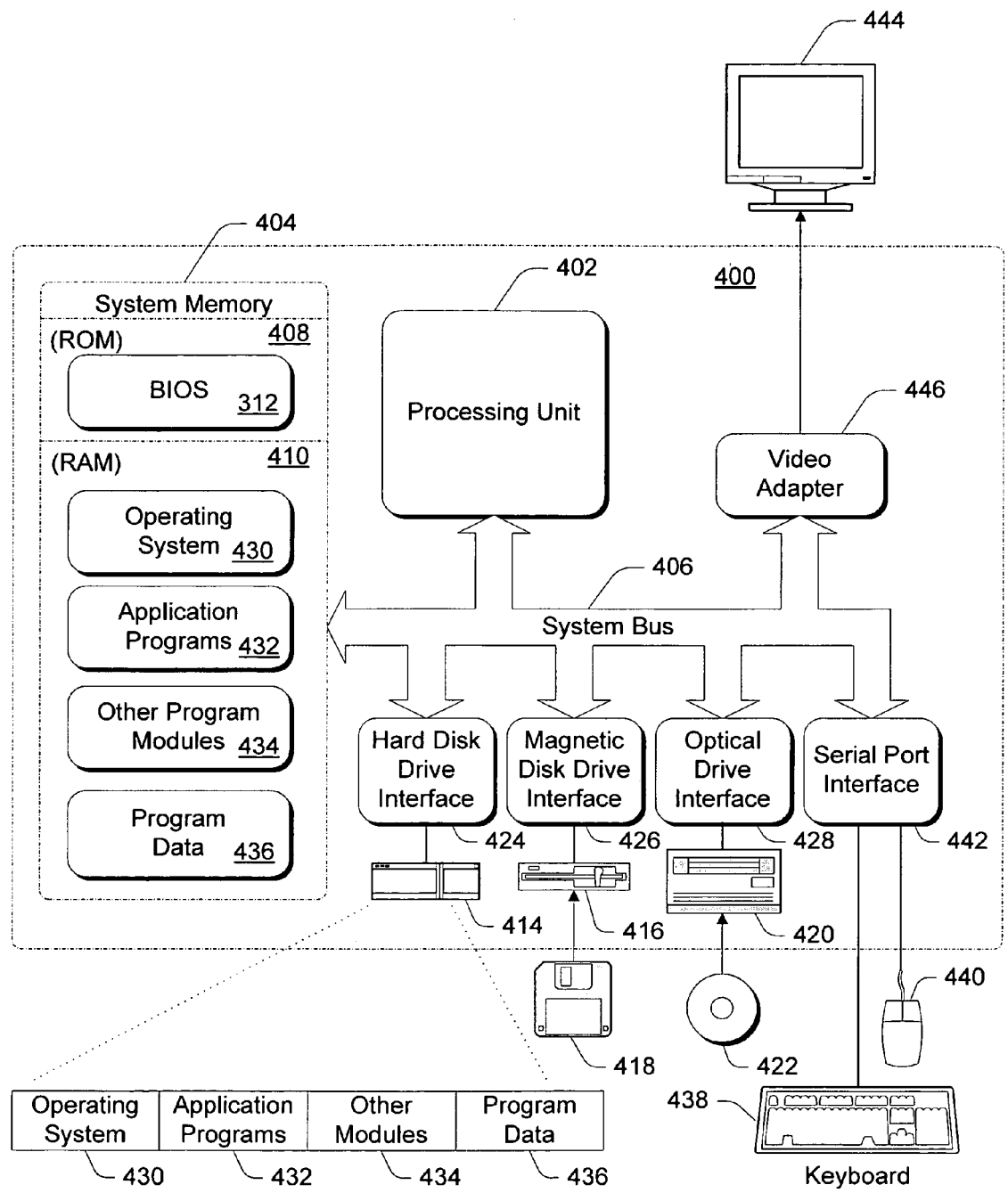
FIG. 4 is a block diagram of an exemplary computing device that can be used to implement the finite state model-based testing system shown in FIG. 3.

FIG. 4 illustrates an example of an independent computing device 400 that can be used to implement the components of the finite state model-based testing system 300 (FIG. 3). Computing device 400 includes one or more processors or processing units 402, a system memory 404, and a bus 406 that couples the various system components including the system memory 404 to processors 402. The bus 406 represents one or more of any of several types of bus structures, including a memory bus or memory controller, a peripheral bus, an accelerated graphics port, and a processor or local bus using any of a variety of bus architectures. The system memory 404 includes read only memory (ROM) 408 and random access memory (RAM) 410. A basic input/output system (BIOS) 412, containing the basic routines that help to transfer information between elements within the computing device 400 is stored in ROM 408.

Computing device 400 further includes a hard drive 414 for reading from and writing to one or more hard disks (not shown). Some computing devices can include a magnetic disk drive 416 for reading from and writing to a removable magnetic disk 418, and an optical disk drive 420 for reading from or writing to a removable optical disk 422 such as a CD ROM or other optical media. The hard drive 414, magnetic disk drive 416, and optical disk drive 420 are connected to the bus 406 by a hard disk drive interface 424, a magnetic disk drive interface 426, and a optical drive interface 428, respectively. Alternatively, the hard drive 414, magnetic disk drive 416, and optical disk drive 420 can be connected to the bus 406 by a SCSI interface (not shown).

The drives and their associated computer-readable media provide nonvolatile storage of computer-readable instructions, data structures, program modules and other data for computing device 400. Although the exemplary environment described herein employs a hard disk 414, a removable magnetic disk 418, and a removable optical disk 422, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on ROM 408, RAM 410, the hard disk 414, magnetic disk 418, or optical disk 422, including an operating system 430, one or more application programs 432, other program modules 434, and program data 436. In some computing devices 400, a user might enter commands and information into the computing device 400 through input devices such as a keyboard 438 and a pointing device 440. Other input devices (not shown) may include a microphone, joystick, game pad, satellite dish, scanner, or the like. In some instances, however, a computing device might not have these types of input devices. These and other input devices are connected to the processing unit 402 through an interface 442 that is coupled to the bus 406. In some computing devices 400, a monitor 444 or other type of display device might also be connected to the bus 406 via an interface, such as a video adapter 446. Some devices, however, do not have these types of display devices. In addition to the monitor 444, computing devices 400 might include other peripheral output devices (not shown) such as speakers and printers.

Generally, the data processors of computing device 400 are programmed by means of instructions stored at different times in the various computer-readable storage media of the computer. Programs and operating systems are typically distributed, for example, on floppy disks or CD-ROMs. From there, they are installed or loaded into the secondary memory of a computing device 400. At execution, they are loaded at least partially into the computing device's primary electronic memory. The computing devices described herein include these and other various types of computer-readable storage media when such media contain instructions or programs for implementing the steps described below in conjunction with a microprocessor or other data processor.

For purposes of illustration, programs and other executable program components such as the operating system are illustrated herein as discrete blocks, although it is recognized that such programs and components reside at various times in different storage components of the computing device 400, and are executed by the data processor(s) of the computer.

Figure 5:
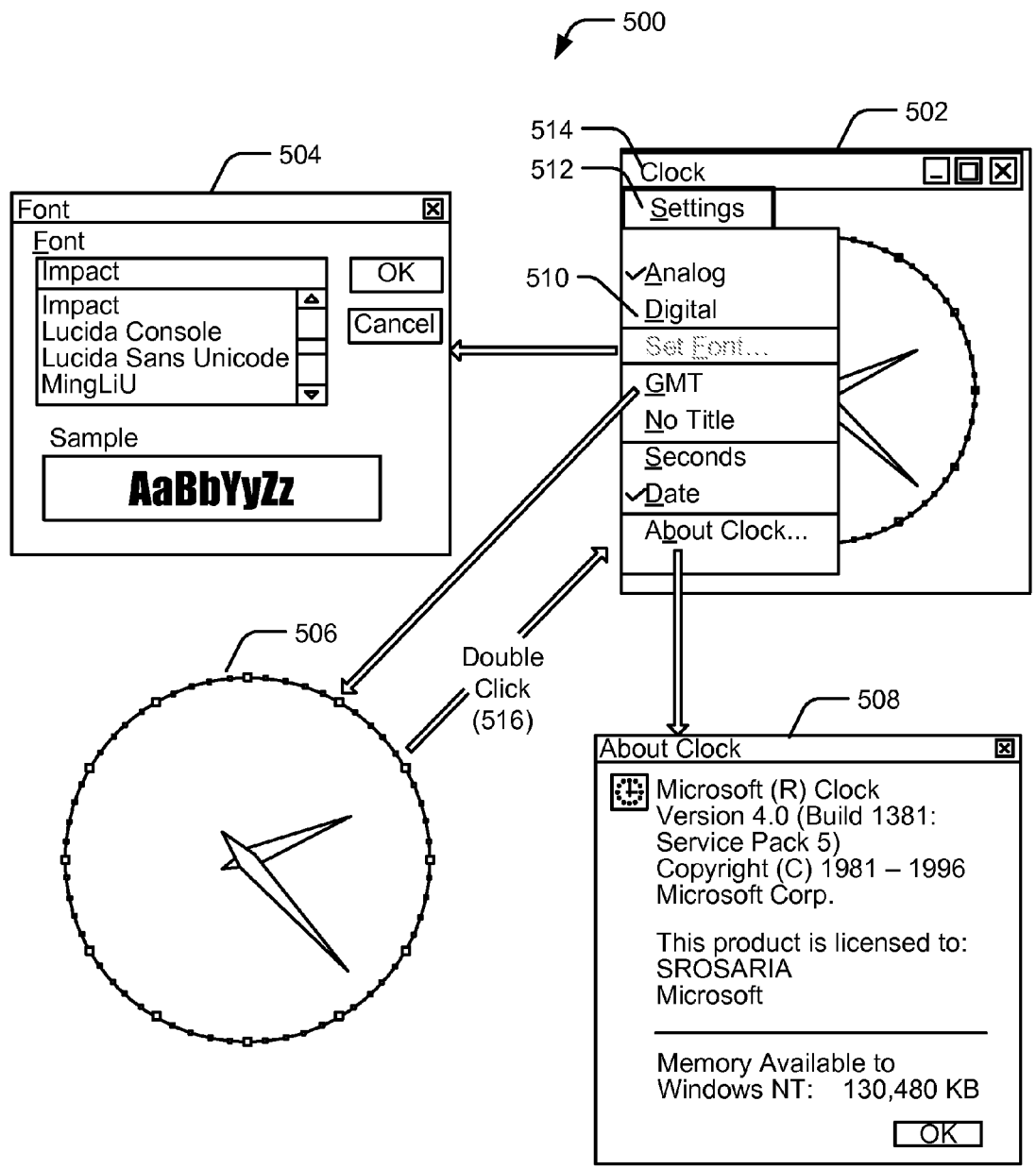
FIG. 5 shows four displays of a software application and is used as an example to illustrate the implementation of the finite state model-based testing system shown in FIG. 3.

FIG. 5 shows four displays 500 of a software application that is used as an example to illustrate the implementation of the finite state model-based testing system 300 (FIG. 3). The software application under test is the same "Windows" Clock application described in the "Background" section. In relation to the finite state model-based testing system 300, the software application under test 304 is the Clock application in this example. The example shown in FIG. 5 expands on the simplified example shown in the "Background" section to better illustrate the system testing interface 306 and the complexity of utilizing model-based testing for even small applications.

The Clock application displays 500 include a main clock display 502, a font dialog display 504, a clock only display 506, and an "About Clock" dialog display 508. The main clock display 502 has a menu 510 that is initiated with a user selectable control, "Settings" 512. The menu 510 enables a user to toggle a seconds, date, and GMT time display. The clock is currently displayed in an analog format, but the display format can be changed via the menu 510 to a digital format (and vice-versa).

Selecting "No Title" on the menu 510 displays the clock without a title bar 514 as shown in the clock only display 506. A user can toggle back to the main clock display 502 by double clicking a user input 516 at the clock only display 506. A user selectable control, "Set Font . . . ", on the menu 510 initiates the font dialog display 504. The "Set Font . . . " user selectable control is only activated for selection when the clock is displayed in the digital format. As shown in FIG. 5 on the menu 510, the "Set Font . . . " user selectable control is not activated because the clock is displayed in the analog format. Another user selectable control, "About Clock . . . ", on the menu 510 initiates the "About Clock" dialog display 508.

Figure 6:
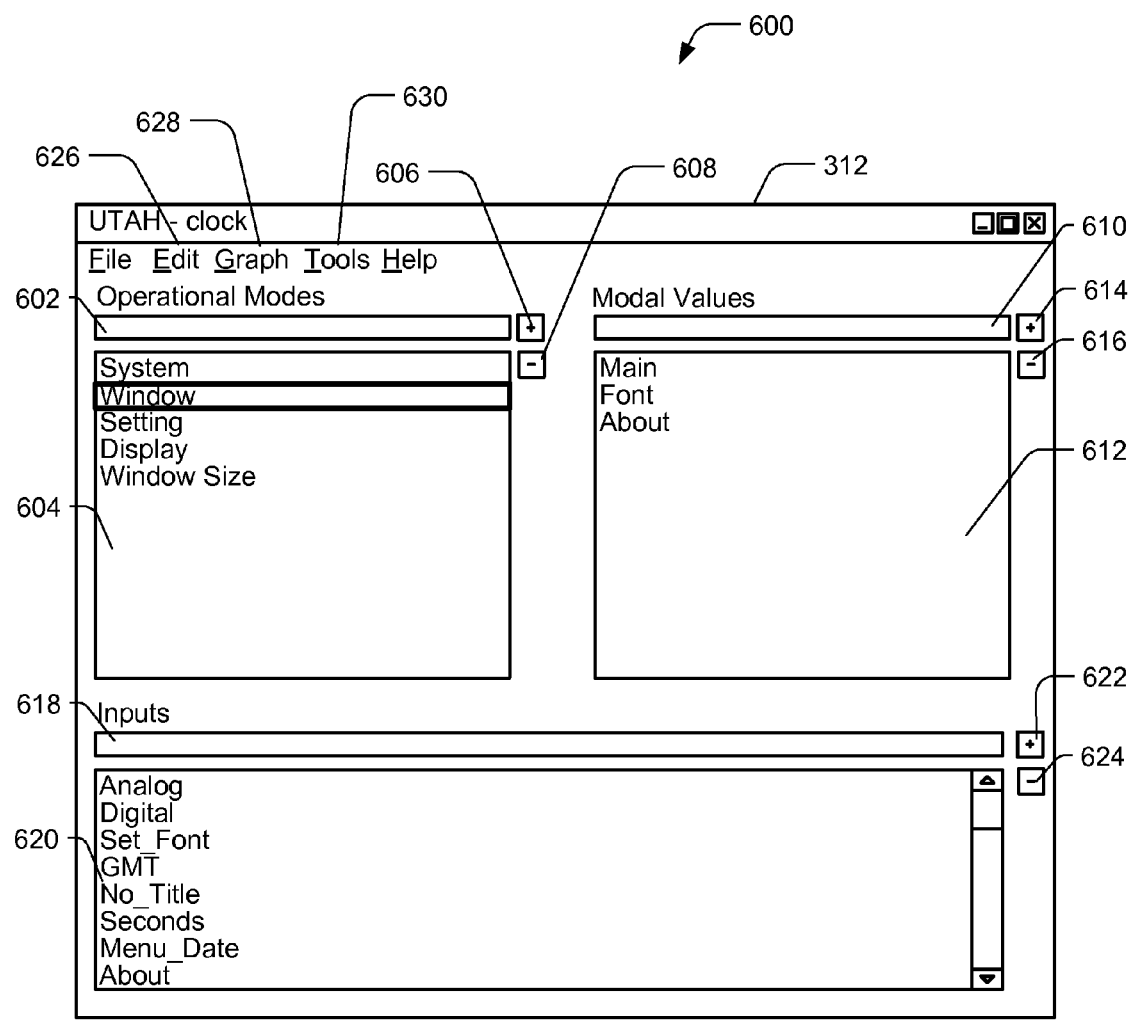
FIG. 6 shows a model editor user interface that enables a user to enter software application test information.

FIG. 6 shows a graphical user interface display 600 of the model editor 312 (FIG. 3) having entry and list fields, as well as user selectable controls, to enable a user to enter the state information to define the model 302 of the software application under test 304. The model editor 312 has an operational modes entry field 602 and an operational modes list field 604. The operational modes fields enable a user to enter operational modes for a software application 304. A user selectable control 606 adds an operational mode entered in field 602 to the operational modes list in field 604. A user selectable control 608 removes an operational mode from the operational modes list field 604.

The model editor 312 also has a modal values entry field 610 and a modal values list field 612. The modal values fields enable a user to enter modal values associated with the operational modes listed in field 604. As shown in the display 600, the modal values "Main", "Font", and "About" in the modal values list field 612 are associated with the operational mode "Window" which is shown selected (hi-lited) in the operational modes list field 604. A user selectable control 614 adds a modal value entered in field 610 to the modal values list in field 612. A user selectable control 616 removes a modal value from the modal values list field 612.

The operational modes and associated modal values for the Clock application example shown in FIG. 5 are shown below in Table 4. The operational modes and modal values are entered via the model editor 312 in the operational modes and modal values fields.

TABLE 4

| Operational Modes | Modal Values |
|---|---|
| System | {Not_Invoked, Invoked} |
| Window | {Main, Font, About} |
| Setting | {Analog, Digital} |
| Display | {All, Clock_Only} |
| WindowSize | {Restored, Maximized, Minimized_from_Maximized, Minimized_from_Restored} |

The modal values associated with the Clock operational mode "System" indicate whether the Clock application is running or not. The modal values associated with the operational mode "Window" indicate whether the main clock display 502 (FIG. 5), the font dialog display 504, or the "About Clock" dialog display 508 has system focus. The modal values associated with the operational mode "Setting" indicate the Clock display format. The modal values associated with the operational mode "Display" indicate whether the Clock is displayed with a title bar as in the main clock display 502, or without a title bar as in the clock only display 506. The modal values associated with the Clock operational mode "WindowSize" indicate the Clock display window status.

The model editor 312 also has an application input entry field 618 and an application input list field 620. The application inputs fields enable a user to enter inputs of the software application under test. A user selectable control 622 adds software application input entered in field 618 to the application inputs list in field 620. The application inputs for the Clock application example shown in FIG. 5 are listed below in Table 5. The software application inputs are entered via the model editor 312 in the application inputs fields.

TABLE 5

| Application Input | Description of Input |
|---|---|
| Analog | Change to analog display. |
| Digital | Change to digital display. |
| Set_Font | Set the display font. Available only for digital setting. |
| GMT | Display the time in GMT. |
| No_Title | Display without title bar. |
| Seconds | Toggle the seconds display. |
| Settings_Date | Toggle the date display. |
| About | Bring up the About dialog display. |
| DoubleClick | Toggle between title bar and clock-only display. |
| Font_OK | Click OK in the Font dialog box. |
| Font_TypeFont | Type a random font name. |
| Font_Cancel | Click Cancel in the Font dialog box. |
| Font_SelectFont | Select a font at random from the font list box. |
| About_OK | Click OK in the About dialog display. |
| Invoke | Launch the application. |
| Terminate_Close | Exit the application by clicking the close window button. |
| Terminate_Keystroke | Exit the application by pressing Alt-F4. |
| Maximize | Maximize the application window. Can only be done if the window is not maximized already. |
| Minimize | Minimize the application window. Can only be done if the window is not minimized already. |
| Restore_Window | Restore the application window. Restores the window to its original size, which could be either the standard window size or the maximized state. |

The model editor 312 has a user selectable menu control "Edit" 626 that enables a user to initiate the rules editor 314. A user selectable menu control "Graph" 628 enables a user to initiate the model generation engine 310 to generate the model 302 of a software application under test 304. A user selectable menu control "Tools" 630 enables a user to both initiate the graph traversal menu 316 and the test execution menu 318.

The automatic generation of a model (i.e., state table) for a software application under test is independent of the complexity of the application. That is to say, a user is not overly burdened with having to model an increasing number of operational modal values as an application is developed and tested. The system testing interface 306 (FIG. 3) and model generation engine 310 can be utilized to simply recalculate and develop a new model 302 if new operational modal values are needed to test the application.

Figure 7:
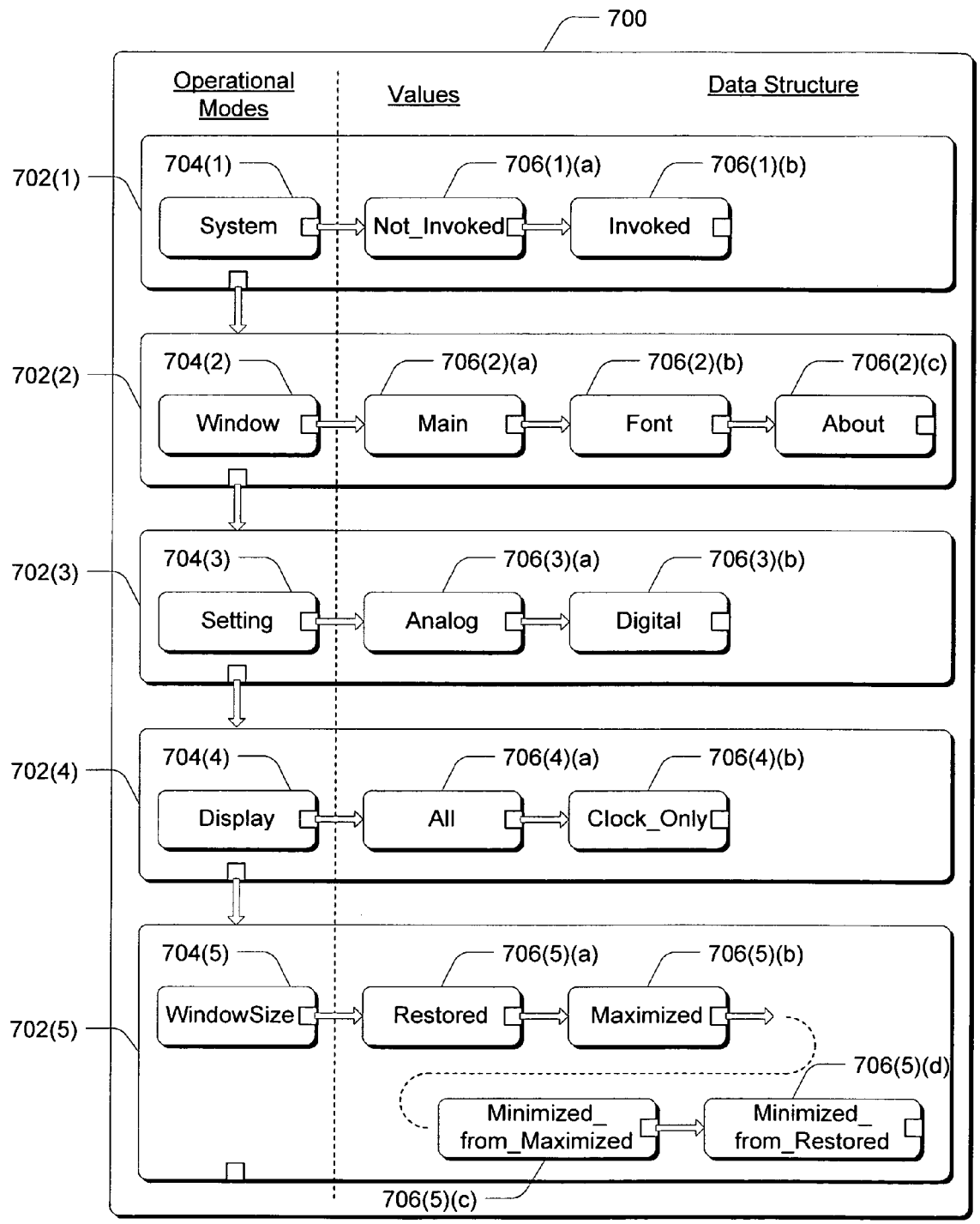
FIG. 7 is a block diagram that illustrates multiple linked data structures to store the application test information entered via the user interface shown in FIG. 6.

FIG. 7 illustrates a data structure 700 having multiple linked data structures. Mode data structures 702(1)-702(5) can be implemented as Component Object Model (COM) objects in a linked list of COM object data structures. The mode data structures 702(1)-702(5) store the operational modes and associated modal values for a software application under test that are entered via the model editor 312 in the operational modes and modal values fields. The mode data structures 702(1)-702(5) in FIG. 7 illustrate the operational modes and associated modal values listed above in Table 4 for the Clock application example shown in FIG. 5. Each mode data structure 702(1)-702(5) stores an operational mode 704(1)-704(5) of the Clock application and the modal values 706(1)(a)-706(5)(d) associated with a particular operational mode. The modal values 706(1)(a)-706(5)(d) are also stored in a linked list of one or more modal values associated with an operational mode.

Figure 8:
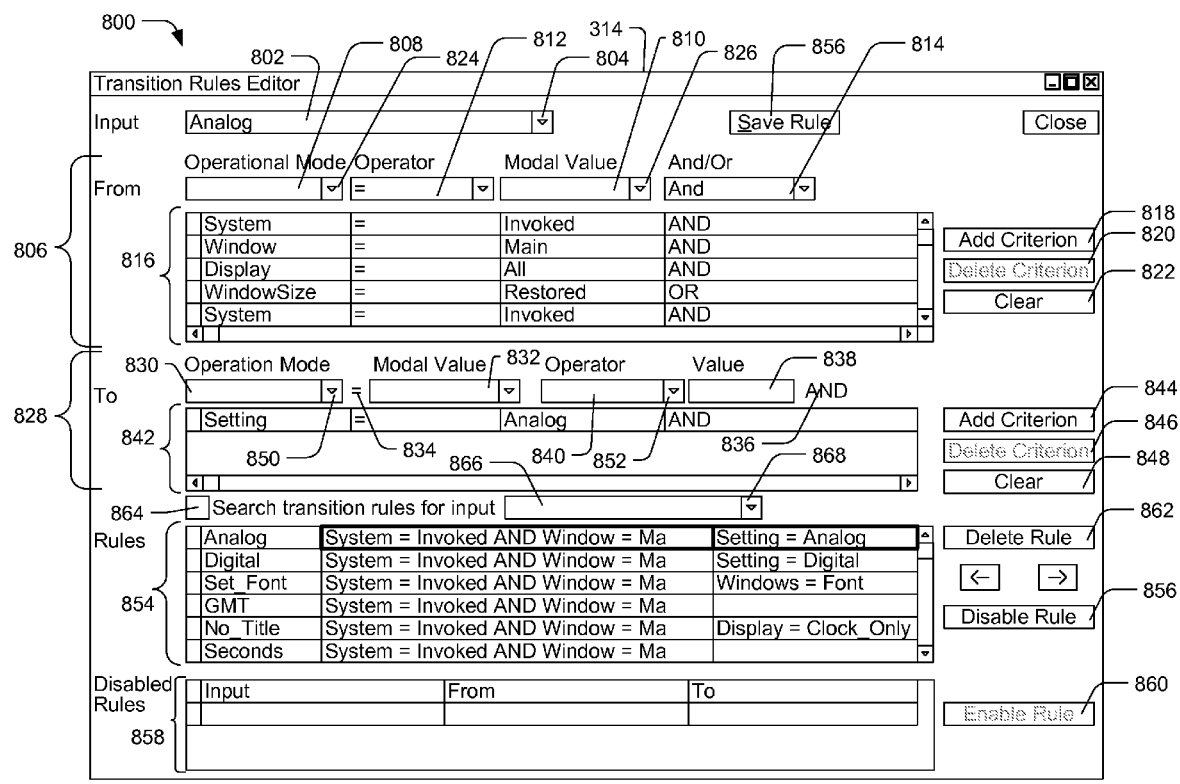
FIG. 8 shows a rules editor user interface that enables a user to enter software application test information.

FIG. 8 shows a user interface display 800 of the rules editor 314 (FIG. 3) having entry and list fields, as well as user selectable controls, to enable a user to enter the transition information to define the model 302 of a software application 304. The rules editor 314 has application input entry field 802 to enable a user to enter an input of the software application under test 304. A user selectable control 804 initiates a scrollable application inputs list field from which a user can select an input of the application. The application inputs that are listed in the scrollable list field are the software application inputs that are entered via the model editor 312 in the application input entry field 618.

The rules editor 314 has current state fields 806 to enable a user to enter parameters for a current state of the application. The current state is associated with an application input that can be selected in the application input entry field 802. The current state fields 806 include a current state operational mode field 808 to enable a user to enter a current state operational mode of the application; a current state modal value field 810 to enable a user to enter modal values associated with the current state operational mode; and a relational operator field 812 to enable user selection of a relational operator that indicates the relation of a current state modal value to a current state operational mode. The relational operators that can be selected in the relational operator field 812 are, $=, \neq, >, \geq, <,$ and $\leq$.

An operational mode, a modal value, and a relational operator together define a single rule criteria entry. A concatenation operator field 814 enables a user to select a concatenation operator that indicates the relation of a current state rule criteria entry to a second current state rule criteria entry. In this example, the concatenation operators that can be selected in the concatenation operator field 814 are either a Boolean AND or a Boolean OR.

A current state rule criteria list field 816 shows current state rule criteria entries that have been entered with a user selectable control "Add Criterion" 818. As shown in FIG. 8, the first rule criteria entry in the current state rule criteria list field 816 is "System=Invoked". The concatenation operator "AND" indicates that "System=Invoked" is ANDed with the second rule criteria entry, "Window=Main", to begin the formation of a current state. The rules editor 312 also has a user selectable control 820 to delete a current state rule criteria entry that has been selected (hi-lited) in the rule criteria list field 816. User selectable control 822 clears all entries from the current state fields 806.

The parameters to be entered in the current state operational mode field 808 and the current state modal value field 810 relate back to the state transition information entered via the model editor 312. A user selectable control 824 initiates a scrollable operational mode list from which a user can select an operational mode of the software application. The operational modes that are listed in the scrollable list field are the operational modes that are entered via the model editor 312 in the operational modes entry field 602. A user selectable control 826 initiates a scrollable modal value list from which a user can select a modal value associated with a selected operational mode. The modal values that are listed in the scrollable list field are the modal values that are entered via the model editor 312 in the modal value entry field 610.

The rules editor 314 has next state fields 828 to enable a user to enter parameters for a next state of the application. The next state fields 828 include a next state operational mode field 830 to enable a user to enter a next state operational mode of the software application under test; a next state modal value field 832 to enable a user to enter modal values associated with the next state operational mode; and a relational operator 834 to indicate that the relation of a next state modal value to a next state operational mode is "=" (i.e., equal to). Just as with the current state fields 806, an operational mode, a modal value, and a relational operator together define a single rule criteria entry. A concatenation operator 836 indicates that the relation of a next state rule criteria entry to a second next state rule criteria entry is "AND".

The next state fields 828 also include a numeric value input field 838 and a logical operator input field 840. A logical operator indicates that the next state rule criteria entry is determined with an assignment expression by indicating the relation of the next state rule criteria to a numeric value. The logical operators that can be selected in the logical operator input field 840 are +, −, *, /, and the logical Boolean NOT operator.

A next state rule criteria list field 842 displays next state rule criteria entries that have been entered with a user selectable control "Add Criterion" 844. As shown in FIG. 8, the only rule criteria entry shown in the next state rule criteria list field 842 is "Setting=Analog". The rules editor 314 also has a user selectable control 846 to delete a next state rule criteria entry that has been selected (hi-lited) in the rule criteria list field 842. User selectable control 848 clears all entries from the next state fields 828.

The parameters to be entered in the next state operational mode field 830 and the next state modal value field 832 relate back to the state transition information entered via the model editor 312. A user selectable control 850 initiates a scrollable operational mode list from which a user can select an operational mode of the software application under test. The operational modes that are listed in the scrollable list field are the operational modes that are entered via the model editor 312 in the operational modes entry field 602. A user selectable control 852 initiates a scrollable modal value list from which a user can select a modal value associated with a selected operational mode. The modal values that are listed in the scrollable list field are the modal values that are entered via the model editor 312 in the modal value entry field 610.

The rules editor 314 has a rules list field 854 to display rule entries that have been entered with a user selectable control "Save Rule" 856. A rule entry in the rules list field 854 includes software application input selected in the application input entry field 802, a current state of the application which is defined by the rule criteria entries in the current state rule criteria list field 816, and a next state of the application which is defined by the rule criteria entries in the next state rule criteria list field 842.

A user selectable control 856 enables a user to disable a rule so that when the model 302 of the software application under test 304 is generated, the model will be defined without the rule. Any disabled rule is shown in the disabled rules list field 858. A user selectable control 860 allows a user to enable a disabled rule so that when the model 302 of the software application 304 is re-generated, the model will again be defined with the rule.

The feature of being able to disable a rule is advantageous when implementing a model-based test. If a particular application input is known to render a developing application under test inoperable, a user can simply disable the particular inoperable input with a single user selection (e.g., a mouse, a keyboard, or other pointing device) and generate a new model to test the application without the input. This is preferable to having to read and modify an entire model to remove all transitions involving the inoperable input, and then consequently having to modify the model again to insert the input back into the model when the application is operating as intended.

The rules editor 314 also has a user selectable control 862 to delete a rule entry that has been selected (hi-lited) in the rules list field 854. A user can search the rules listed in the rules list field 854 for a specific application input by selecting the rules search checkbox 864. Selecting the search checkbox 864 initiates an application input entry field 866 to enable a user to enter an input of the application to be searched for. A user selectable control 868 initiates a scrollable application inputs list field from which a user can select an input of the software application. The application inputs that are listed in the scrollable list field are the application inputs that are input with the model editor 312 in the application input entry field 618.

A complete list of the transition rules for the Clock application shown in FIG. 5 is provided below under the heading "Clock Application Rules". The rules include an application input, a current state or states of the software application, and a next state of the application. A complete model (i.e., state transition table) for the Clock application, as generated by the model generation engine 310, is provided below under the heading "Clock Application Model".

Figure 9:
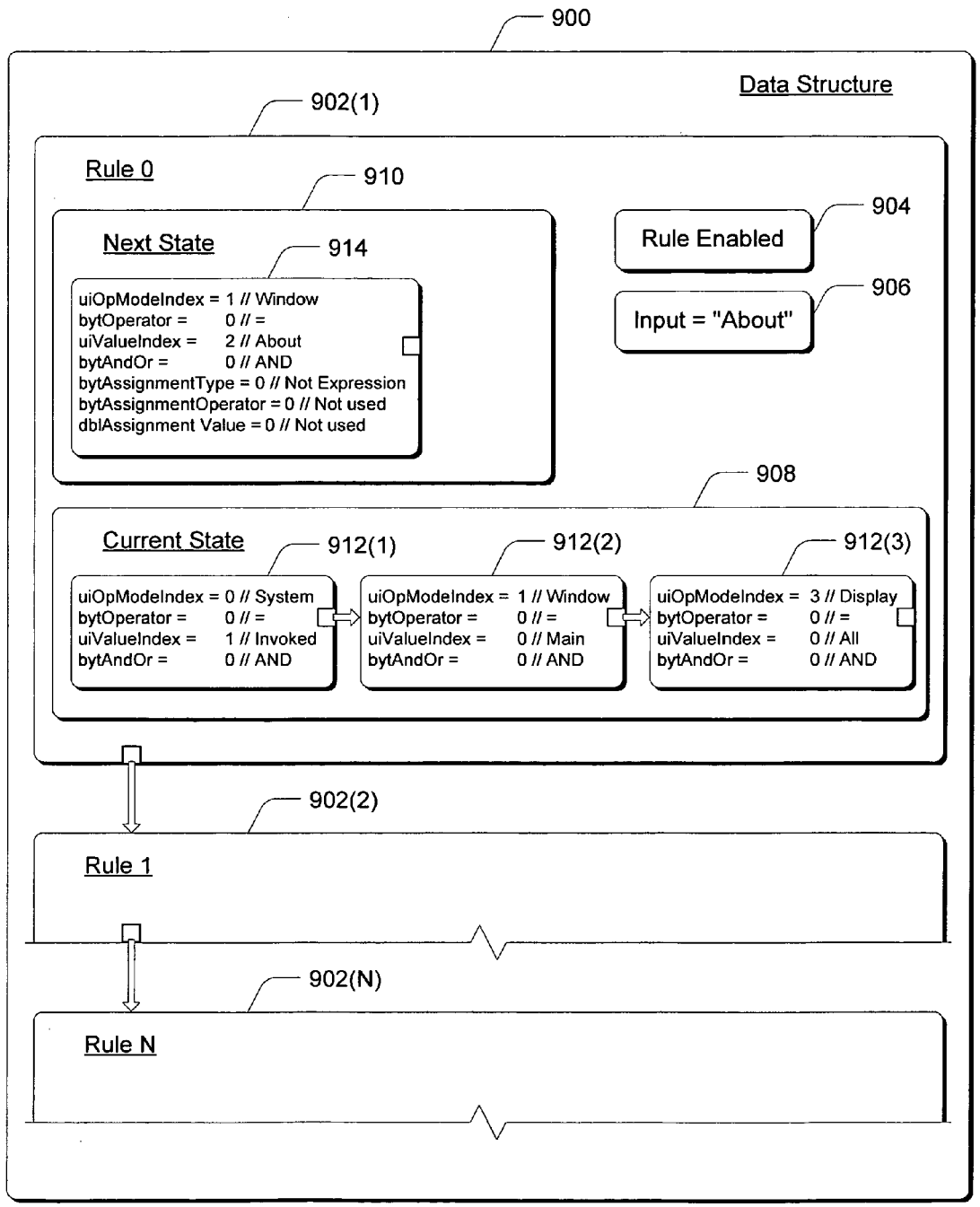
FIG. 9 is a block diagram that illustrates multiple linked data structures to store the application test information entered via the user interface shown in FIG. 8.

FIG. 9 illustrates a data structure 900 having multiple linked data structures. Rule data structures 902(1)-902(N) can be implemented as COM objects in a linked list of COM object data structures. The rule data structures 902(1)-902(N) store the transition rules from the rules list field 854 (FIG. 8), and each rule data structure 902(1)-902(N) stores the information for one rule. Each rule data structure 902(1)-902(N) has a bit field 904 to indicate whether the rule is enabled or disabled. Additionally, each rule data structure 902(1)-902(N) stores an application input 906, a current state of the application 908, and a next state of the application 910.

The current state 908 is stored in a linked list of one or more rule criteria data structures 912(1)-912(3). The next state 910 is also stored in a linked list of one or more rule criteria data structures 914. A rule criteria data structure 912(1)-912(3) for a current state 908 is defined by a RuleCriterion data structure shown following:

```
struct RuleCriterion
{
    unsigned short uiOpModeIndex;
    BYTE bytOperator;
    unsigned short uiValueIndex;
    BYTE bytAndOr;
};
```

For a current state of the application 908, a rule criteria data structure 912(1)-912(3) stores an operational mode variable (uiOpModeIndex) to indicate an operational mode of the software application under test; a modal value variable (uiValueIndex) to indicate a modal value associated with the operational mode; a relational operator variable (bytOperator) to indicate the relation of the modal value to the operational mode; and a concatenation operator variable (bytAndOr) to indicate the relation of a current state rule criteria entry to a second current state rule criteria entry in the linked list of rule criteria data structures 912(1)-912(3).

The variables uiOpModeIndex and uiValueIndex are indices to the respective model editor 312 operational mode and modal values list fields (FIG. 6). The variables assigned to the operational modes shown in the operational modes list field 604, and shown in the modal values list field 612 are as follows:

| Operational Mode | uiOpModeIndex | Modal Value | uiValueIndex |
|---|---|---|---|
| System | 0 | | |
| Window | 1 | Main | 0 |
| | | Font | 1 |
| | | About | 2 |
| Setting | 2 | | |
| Display | 3 | | |
| WindowSize | 4 | | |

The rule criteria data structures 912(1)-912(3) and 914 in FIG. 9 show the values of the RuleCriterion data structure variables for the Clock application input "About" 906. The second current state rule criteria data structure 912 (2) shows that the rule criteria entry is "Window=Main". Accordingly, the uiOpModeIndex=1 (for Window) and the uiValueIndex=0 (for Main).

For a next state 910, a rule criteria data structure 914 is defined by a RuleCriterion data structure shown following:

```
struct asgnRuleCriterion
{
    unsigned short uiOpModeIndex;
    BYTE bytOperator;
    unsigned short uiValueIndex;
    BYTE bytAndOr;
    BYTE bytAssignmentType;
    BYTE bytAssignmentOperator;
    double dblAssignmentValue;
};
```

For a next state of the software application 910, a rule criteria data structure 914 stores an operational mode variable (uiOpModeIndex) to indicate an operational mode of the software application under test; a modal value variable (uiValueIndex) to indicate a modal value associated with the operational mode; a relational operator variable (bytOperator) to indicate the relation of the modal value to the operational mode; a concatenation operator variable (bytAndOr) to indicate the relation of a next state rule criteria to a second next state rule criteria in the linked list of rule criteria data structures 914; an assignment variable (bytAssignmentType) to indicate if the next state rule criteria is determined with an assignment expression; a numeric value variable (dblAssignmentValue); and a logical operator variable (bytAssignmentOperator) to indicate the assignment expression relation of the next state rule criteria to the numeric value.

The assignment variables bytAssignmentType, bytAssignmentOperator, and dblAssignmentValue are used to define a next state rule criteria of the application. The variables define that the value of a next state rule criteria can be calculated from an assignment expression such as [Current Value]=[Current Value]+1.

Figure 10:
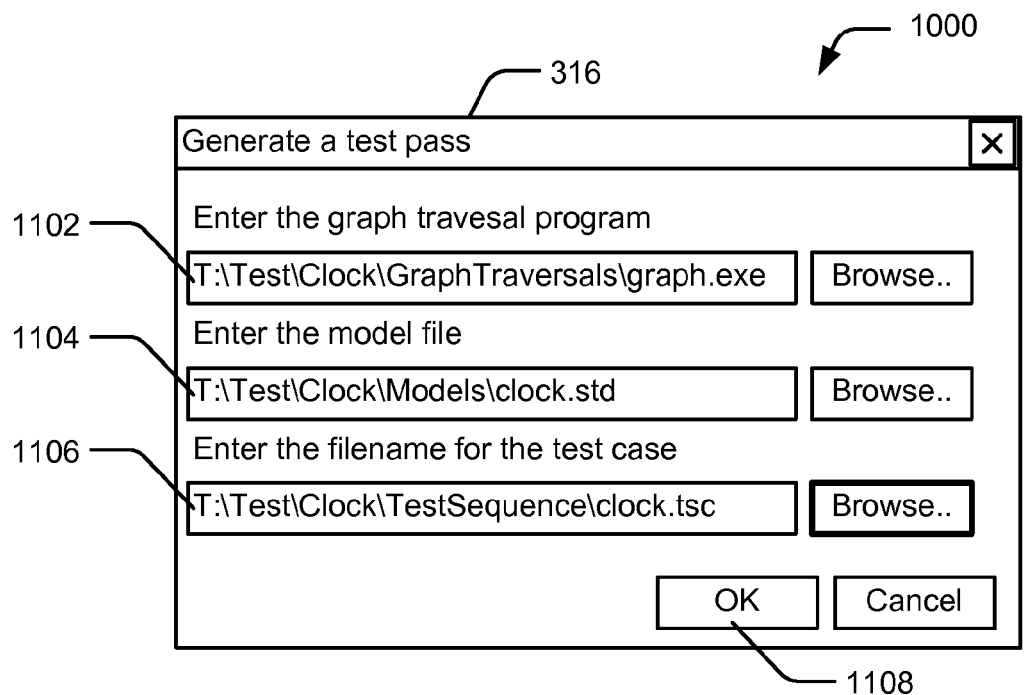
FIG. 10 shows a graph traversal menu user interface that enables a user to initiate a software application testing component.

FIG. 10 shows a graphical user interface display 1000 of the graph traversal menu 316 (FIG. 3) having entry fields that enables a user to select a graph traversal program and generate a test sequence of inputs for the software application under test 304. The graph traversal menu 316 has a graph traversal program field 1002 to enable a user to select the graph traversal program, a model file field 1004 to enable a user to select the model 302 of the software application under test, and a test sequence file field 1006 to enable a user to enter a memory (e.g., disk) storage location for a test sequence file.

The test sequence file contains the test sequence of inputs for the software application. The user selectable control "OK" 1008 initiates the generation of the test sequence of application inputs.

Figure 11:
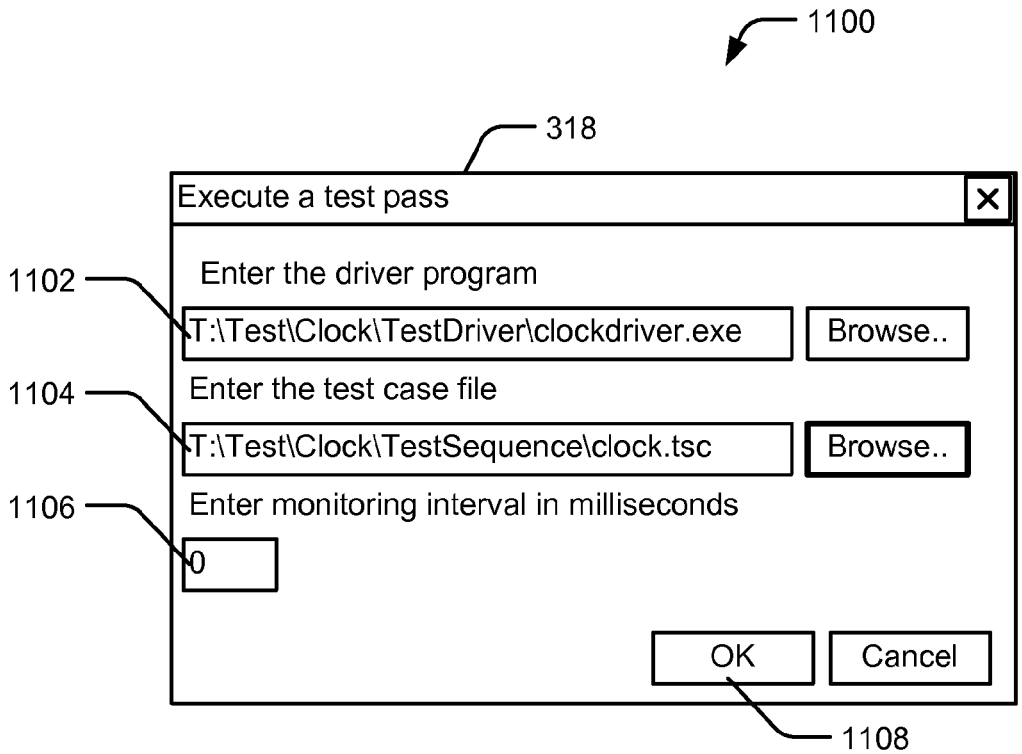
FIG. 11 shows a test execution menu user interface that enables a user to initiate a software application testing component.

FIG. 11 shows a graphical user interface display 1100 of the test execution menu 318 (FIG. 3) that enables a user to select a test driver program and initiate a test of the software application. The test execution menu 318 has a test driver program field 1102 to enable a user to select a test driver program, a test sequence file field 1104 to enable a user to select a test sequence file containing the test sequence of inputs for the software application under test 304, and a test monitoring interval field 1106 to enable a user to enter a timing interval to define how often the test driver program can be monitored to detect a failure of the test driver program. The user selectable control "OK" 1108 initiates the test of the software application.

Figure 12:
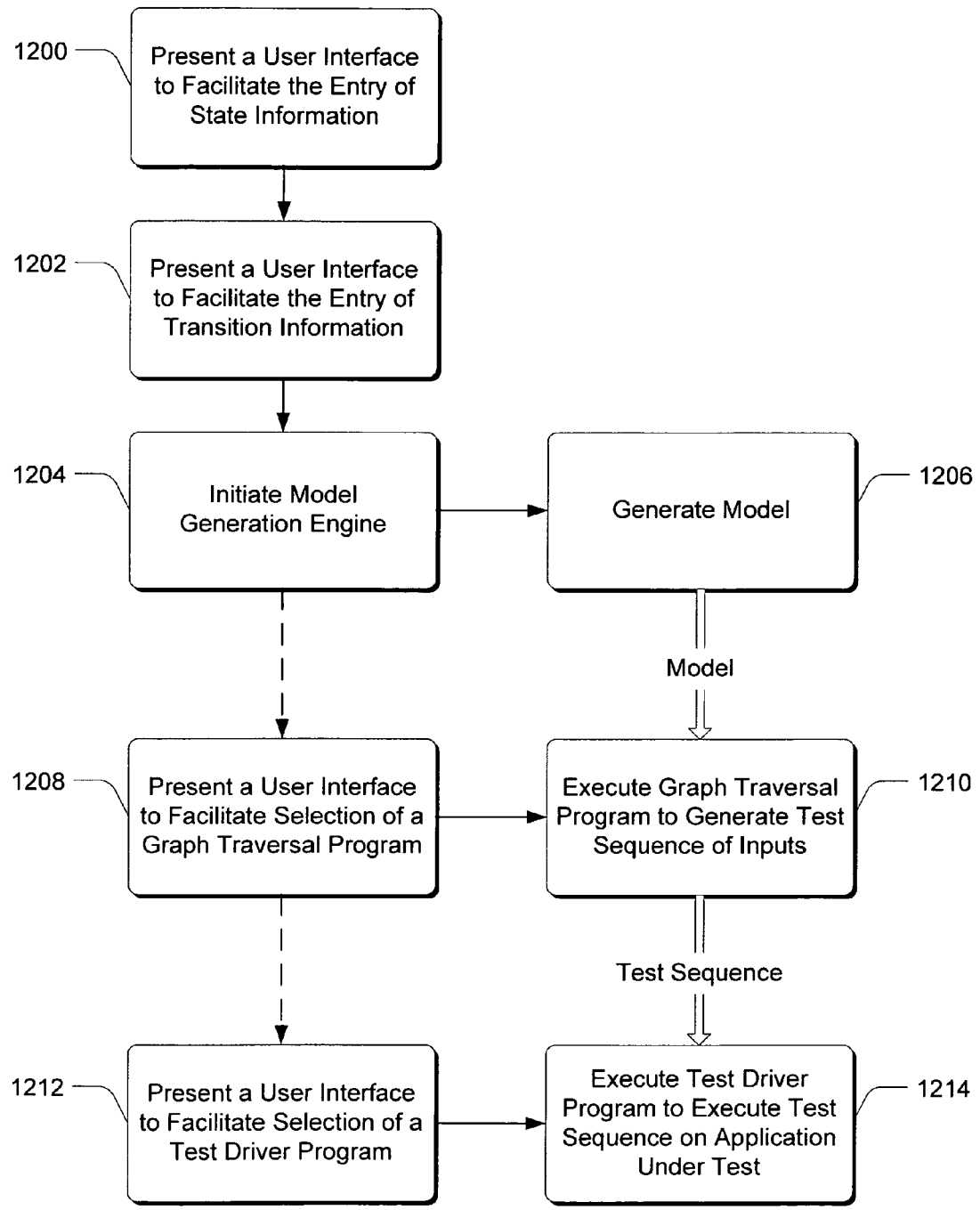
FIG. 12 is a flow diagram that describes a method to test a software application.

FIG. 12 is a flow diagram that describes a method to test a software application. The method includes presenting a user interface to facilitate entry of state information about a software application to be tested (block 1200). As an example, the user may use the model editor 312 illustrated in FIG. 6 to enter state information. A second user interface may then be presented to facilitate entry of transition information about the software application (block 1202). The rules editor 314 illustrated in FIG. 8 is an example of one such user interface.

A model generation engine is initiated to generate a model of the software application from the state and transition information (block 1204). Subsequently, a model is generated at block 1206. The method also includes presenting a user interface to facilitate the selection of a graph traversal program to generate a test sequence of inputs for the software application (block 1208). One example of this user interface is the graph traversal menu 316 illustrated in FIG. 10. When executed, the graph traversal program generates the test sequence of inputs from the model of the software application (illustrated in FIG. 12 as an input of the model from step 1206 to step 1210).

The method further includes presenting a user interface to facilitate the selection of a test driver program to execute the test sequence of inputs on the software application (block 1212). One example of this user interface is the test execution menu 318 illustrated in FIG. 11. When executed, the test driver program executes the test sequence of inputs on the software application under test (the test sequence is illustrated in FIG. 12 as an input to the test driver program from step 1210 to step 1214).

| Clock Application Rules | | |
|---|---|---|
| System Input | Current State | New Mode Value(s) |
| Analog | System = Invoked AND<br>Window = Main AND<br>Display = All AND<br>WindowSize = Restored OR<br>System = Invoked AND<br>Window = Main AND<br>Display = All AND<br>WindowSize = Maximized | Setting = Analog |
| Digital | System = Invoked AND<br>Window = Main AND<br>Display = All AND<br>WindowSize = Restored OR<br>System = Invoked AND<br>Window = Main AND<br>Display = All AND<br>WindowSize = Maximized | Setting = Digital |
| Set_Font | System = Invoked AND<br>Window = Main AND<br>Setting = Digital AND<br>Display = All AND<br>WindowSize = Restored OR<br>System = Invoked AND<br>Window = Main AND<br>Setting = Digital AND<br>Display = All AND<br>WindowSize = Maximized | Window = Font |
| GMT | System = Invoked AND<br>Window = Main AND<br>Display = All AND<br>WindowSize = Restored OR<br>System = Invoked AND<br>Window = Main AND<br>Display = All AND<br>WindowSize = Maximized | |
| No_Title | System = Invoked AND<br>Window = Main AND<br>Display = All AND<br>WindowSize = Restored OR<br>System = Invoked AND<br>Window = Main AND<br>Display = All AND<br>WindowSize = Maximized | Display = Clock_Only |
| Seconds | System = Invoked AND<br>Window = Main AND<br>Display = All AND | |

-continued

| | Clock Application Rules | |
|---|---|---|
| System Input | Current State | New Mode Value(s) |
| | WindowSize = Restored OR System = Invoked AND Window = Main AND Display = All AND WindowSize = Maximized | |
| Settings_Date | System = Invoked AND Window = Main AND Display = All AND WindowSize = Restored OR System = Invoked AND Window = Main AND Display = All AND WindowSize = Maximized | |
| About | System = Invoked AND Window = Main AND Display = All AND WindowSize = Restored OR System = Invoked AND Window = Main AND Display = All AND WindowSize = Maximized | Window = About |
| DoubleClick | System = Invoked AND Window = Main AND WindowSize = Restored OR System = Invoked AND Window = Main AND WindowSize = Maximized | Display = Display NOT |
| Font_OK | System = Invoked AND Window = Font AND Setting = Digital AND Display = All AND WindowSize = Restored OR System = Invoked AND Window = Font AND Setting = Digital AND Display = All AND WindowSize = Maximized | Window = Main |
| Font_TypeFont | System = Invoked AND Window = Font AND Setting = Digital AND Display = All AND WindowSize = Restored OR System = Invoked AND Window = Font AND Setting = Digital AND Display = All AND WindowSize = Maximized | |
| Font_Cancel | System = Invoked AND Window = Font AND Setting = Digital AND Display = All AND WindowSize = Restored OR System = Invoked AND Window = Font AND Setting = Digital AND Display = All AND WindowSize = Maximized | Window = Main |
| Font_SelectFont | System = Invoked AND Window = Font AND Setting = Digital AND Display = All AND WindowSize = Restored OR System = Invoked AND Window = Font AND Setting = Digital AND Display = All AND WindowSize = Maximized | |
| About_OK | System = Invoked AND Window = About AND Display = All AND WindowSize = Restored OR System = Invoked AND Window = About AND Display = All AND WindowSize = Maximized | Window = Main |

-continued

Clock Application Rules

| System Input | Current State | New Mode Value(s) |
|---|---|---|
| Invoke | System = Not_Invoked AND Window = Main AND WindowSize = Restored OR System = Not_Invoked AND Window = Main AND WindowSize = Maximized | System = Invoked |
| Invoke | System = Not_Invoked AND Window = Main AND Display = All AND WindowSize = Minimized_From_Restored OR System = Not_Invoked AND Window = Main AND Display = All AND WindowSize = Minimized_From_Maximized | System = Invoked AND WindowSize = Minimized_From_Restored |
| Terminate_Close | System = Invoked AND Window = Main AND Display = All AND WindowSize = Restored OR System = Invoked AND Window = Main AND Display = All AND WindowSize = Maximized | System = Not_Invoked |
| Terminate_Keystroke | System = Invoked AND Window = Main AND WindowSize != Minimized_From_Restored AND WindowSize != Minimized_From_Maximized OR System = Invoked AND Window = Main AND Display = All AND WindowSize = Minimized_From_Restored OR System = Invoked AND Window = Main AND Display = All AND WindowSize = Minimized_From_Maximized | System = Not_Invoked |
| Maximize | System = Invoked AND Window = Main AND Display = All AND WindowSize != Maximized | WindowSize = Maximized |
| Minimize | System = Invoked AND Window = Main AND Display = All AND WindowSize = Restored | WindowSize = Minimized_From_Restored |
| Minimize | System = Invoked AND Window = Main AND Display = All AND WindowSize = Maximized | WindowSize = Minimized_From_Maximized |
| Restore_Window | System = Invoked AND Window = Main AND Display = All AND WindowSize = Minimized_From_Restored | WindowSize = Restored |
| Restore_Window | System = Invoked AND Window = Main AND Display = All AND WindowSize = Minimized_From_Maximized | WindowSize = Maximized |
| Restore_Window | System = Invoked AND Window = Main AND Display = All AND WindowSize = Maximized | WindowSize = Restored |

| Clock Application Model | | |
|---|---|---|
| Current State | Input | Next State |
| Not_Invoked Main Analog All Restored | Invoke | Invoked Main Analog All Restored |
| Not_Invoked Main Analog All Maximized | Invoke | Invoked Main Analog All Maximized |
| Not_Invoked Main Analog All Minimized_From_Maximized | Invoke | Invoked Main Analog All Minimized_From_Restored |
| Not_Invoked Main Analog All Minimized_From_Restored | Invoke | Invoked Main Analog All Minimized_From_Restored |
| Not_Invoked Main Analog Clock_Only Restored | Invoke | Invoked Main Analog Clock_Only Restored |
| Not_Invoked Main Analog Clock_Only Maximized | Invoke | Invoked Main Analog Clock_Only Maximized |
| Not_Invoked Main Digital All Restored | Invoke | Invoked Main Digital All Restored |
| Not_Invoked Main Digital All Maximized | Invoke | Invoked Main Digital All Maximized |
| Not_Invoked Main Digital All Minimized_From_Maximized | Invoke | Invoked Main Digital All Minimized_From_Restored |
| Not_Invoked Main Digital All Minimized_From_Restored | Invoke | Invoked Main Digital All Minimized_From_Restored |
| Not_Invoked Main Digital Clock_Only Restored | Invoke | Invoked Main Digital Clock_Only Restored |
| Not_Invoked Main Digital Clock_Only Maximized | Invoke | Invoked Main Digital Clock_Only Maximized |
| Invoked Main Analog All Restored | Analog | Invoked Main Analog All Restored |
| Invoked Main Analog All Restored | Digital | Invoked Main Digital All Restored |
| Invoked Main Analog All Restored | GMT | Invoked Main Analog All Restored |
| Invoked Main Analog All Restored | No_Title | Invoked Main Analog Clock_Only Restored |
| Invoked Main Analog All Restored | Seconds | Invoked Main Analog All Restored |
| Invoked Main Analog All Restored | Settings_Date | Invoked Main Analog All Restored |
| Invoked Main Analog All Restored | About | Invoked About Analog All Restored |
| Invoked Main Analog All Restored | DoubleClick | Invoked Main Analog Clock_Only Restored |
| Invoked Main Analog All Restored | Terminate_Close | Not_Invoked Main Analog All Restored |
| Invoked Main Analog All Restored | Terminate_Keystroke | Not_Invoked Main Analog All Restored |
| Invoked Main Analog All Restored | Maximize | Invoked Main Analog All Maximized |
| Invoked Main Analog All Restored | Minimize | Invoked Main Analog All Minimized_From_Restored |
| Invoked Main Analog All Maximized | Analog | Invoked Main Analog All Maximized |
| Invoked Main Analog All Maximized | Digital | Invoked Main Digital All Maximized |
| Invoked Main Analog All Maximized | GMT | Invoked Main Analog All Maximized |
| Invoked Main Analog All Maximized | No_Title | Invoked Main Analog Clock_Only Maximized |
| Invoked Main Analog All Maximized | Seconds | Invoked Main Analog All Maximized |
| Invoked Main Analog All Maximized | Settings_Date | Invoked Main Analog All Maximized |
| Invoked Main Analog All Maximized | About | Invoked About Analog All Maximized |
| Invoked Main Analog All Maximized | DoubleClick | Invoked Main Analog Clock_Only Maximized |
| Invoked Main Analog All Maximized | Terminate_Close | Not_Invoked Main Analog All Maximized |
| Invoked Main Analog All Maximized | Terminate_Keystroke | Not_Invoked Main Analog All Maximized |
| Invoked Main Analog All Maximized | Minimize | Invoked Main Analog All Minimized_From_Maximized |
| Invoked Main Analog All Maximized | Restore_Window | Invoked Main Analog All Restored |
| Invoked Main Analog All Minimized_From_Maximized | Terminate_Keystroke | Not_Invoked Main Analog All Minimized_From_Maximized |

-continued

| Clock Application Model | | |
|---|---|---|
| Current State | Input | Next State |
| Invoked Main Analog All Minimized_From_Maximized | Maximize | Invoked Main Analog All Maximized |
| Invoked Main Analog All Minimized_From_Maximized | Restore_Window | Invoked Main Analog All Maximized |
| Invoked Main Analog All Minimized_From_Restored | Terminate_Keystroke | Not_Invoked Main Analog All Minimized_From_Restored |
| Invoked Main Analog All Minimized_From_Restored | Maximize | Invoked Main Analog All Maximized |
| Invoked Main Analog All Minimized_From_Restored | Restore_Window | Invoked Main Analog All Restored |
| Invoked Main Analog Clock_Only Restored | DoubleClick | Invoked Main Analog All Restored |
| Invoked Main Analog Clock_Only Restored | Terminate_Keystroke | Not_Invoked Main Analog Clock_Only Restored |
| Invoked Main Analog Clock_Only Maximized | DoubleClick | Invoked Main Analog All Maximized |
| Invoked Main Analog Clock_Only Maximized | Terminate_Keystroke | Not_Invoked Main Analog Clock_Only Maximized |
| Invoked Main Digital All Restored | Analog | Invoked Main Analog All Restored |
| Invoked Main Digital All Restored | Digital | Invoked Main Digital All Restored |
| Invoked Main Digital All Restored | Set_Font | Invoked Font Digital All Restored |
| Invoked Main Digital All Restored | GMT | Invoked Main Digital All Restored |
| Invoked Main Digital All Restored | No_Title | Invoked Main Digital Clock_Only Restored |
| Invoked Main Digital All Restored | Seconds | Invoked Main Digital All Restored |
| Invoked Main Digital All Restored | Settings_Date | Invoked Main Digital All Restored |
| Invoked Main Digital All Restored | About | Invoked About Digital All Restored |
| Invoked Main Digital All Restored | DoubleClick | Invoked Main Digital Clock_Only Restored |
| Invoked Main Digital All Restored | Terminate_Close | Not_Invoked Main Digital All Restored |
| Invoked Main Digital All Restored | Terminate_Keystroke | Not_Invoked Main Digital All Restored |
| Invoked Main Digital All Restored | Maximize | Invoked Main Digital All Maximized |
| Invoked Main Digital All Restored | Minimize | Invoked Main Digital All Minimized_From_Restored |
| Invoked Main Digital All Maximized | Analog | Invoked Main Analog All Maximized |
| Invoked Main Digital All Maximized | Digital | Invoked Main Digital All Maximized |
| Invoked Main Digital All Maximized | Set_Font | Invoked Font Digital All Maximized |
| Invoked Main Digital All Maximized | GMT | Invoked Main Digital All Maximized |
| Invoked Main Digital All Maximized | No_Title | Invoked Main Digital Clock_Only Maximized |
| Invoked Main Digital All Maximized | Seconds | Invoked Main Digital All Maximized |
| Invoked Main Digital All Maximized | Settings_Date | Invoked Main Digital All Maximized |
| Invoked Main Digital All Maximized | About | Invoked About Digital All Maximized |
| Invoked Main Digital All Maximized | DoubleClick | Invoked Main Digital Clock_Only Maximized |
| Invoked Main Digital All Maximized | Terminate_Close | Not_Invoked Main Digital All Maximized |
| Invoked Main Digital All Maximized | Terminate_Keystroke | Not_Invoked Main Digital All Maximized |
| Invoked Main Digital All Maximized | Minimize | Invoked Main Digital All Minimized_From_Maximized |
| Invoked Main Digital All Maximized | Restore_Window | Invoked Main Digital All Restored |
| Invoked Main Digital All Minimized_From_Maximized | Terminate_Keystroke | Not_Invoked Main Digital All Minimized_From_Maximized |
| Invoked Main Digital All Minimized_From_Maximized | Maximize | Invoked Main Digital All Maximized |

Clock Application Model (continued)

| Current State | Input | Next State |
|---|---|---|
| Invoked Main Digital All Minimized_From_Maximized | Restore_Window | Invoked Main Digital All Maximized |
| Invoked Main Digital All Minimized_From_Restored | Terminate_Keystroke | Not_Invoked Main Digital All Minimized_From_Restored |
| Invoked Main Digital All Minimized_From_Restored | Maximize | Invoked Main Digital All Maximized |
| Invoked Main Digital All Minimized_From_Restored | Restore_Window | Invoked Main Digital All Restored |
| Invoked Main Digital Clock_Only Restored | DoubleClick | Invoked Main Digital All Restored |
| Invoked Main Digital Clock_Only Restored | Terminate_Keystroke | Not_Invoked Main Digital Clock_Only Restored |
| Invoked Main Digital Clock_Only Maximized | DoubleClick | Invoked Main Digital All Maximized |
| Invoked Main Digital Clock_Only Maximized | Terminate_Keystroke | Not_Invoked Main Digital Clock_Only Maximized |
| Invoked Font Digital All Restored | Font_OK | Invoked Main Digital All Restored |
| Invoked Font Digital All Restored | Font_TypeFont | Invoked Font Digital All Restored |
| Invoked Font Digital All Restored | Font_Cancel | Invoked Main Digital All Restored |
| Invoked Font Digital All Restored | Font_SelectFont | Invoked Font Digital All Restored |
| Invoked Font Digital All Maximized | Font_OK | Invoked Main Digital All Maximized |
| Invoked Font Digital All Maximized | Font_TypeFont | Invoked Font Digital All Maximized |
| Invoked Font Digital All Maximized | Font_Cancel | Invoked Main Digital All Maximized |
| Invoked Font Digital All Maximized | Font_SelectFont | Invoked Font Digital All Maximized |
| Invoked About Analog All Restored | About_OK | Invoked Main Analog All Restored |
| Invoked About Analog All Maximized | About_OK | Invoked Main Analog All Maximized |
| Invoked About Digital All Restored | About_OK | Invoked Main Digital All Restored |
| Invoked About Digital All Maximized | About_OK | Invoked Main Digital All Maximized |

The finite state model-based testing system 300 includes an option that will generate a skeleton of the testing source code for the test drivers for "Microsoft Visual C++", "Microsoft Visual Basic", and "Rational Visual Test". A user can then insert the programmable code for the individual function actions to test a particular software application.

The model-based system testing interface 306 minimizes a tester's burden (e.g., time, labor, and expense) in developing a model 302 for a software application under test, thus facilitating the use of model-based testing. Facilitating the use of model-based testing will result in better test coverage for a particular software application, which in turn will result in applications of higher quality.

Although embodiments of Finite State Model-Based Testing User Interface have been described in language specific to structural features and/or methods, it is to be understood that the subject of the appended claims is not necessarily limited to the specific features or methods described. Rather, the specific features and methods are disclosed as exemplary implementations of Finite State Model-Based Testing User Interface.

The invention claimed is:

1. One or more computer readable storage media comprising computer executable instructions that, when executed, direct a computing device to:

present a graphical user interface that facilitates user entry of state information and transition information that describes a software application to be tested;

generate a model of the software application from the state information and the transition information; and generate a test sequence of inputs for the software application from the model of the software application.

2. One or more computer readable storage media as recited in claim 1, further comprising computer executable instructions that, when executed, direct the computing device to present a graphical user interface that facilitates user selection of a graph traversal program to generate the test sequence of inputs for the software application.

3. One or more computer readable storage media as recited in claim 1, further comprising computer executable instructions that, when executed, direct the computing device to:

present a graphical user interface that facilitates user selection of a test driver program; and execute the test sequence of inputs on the software application with the test driver program.

4. One or more computer readable storage media as recited in claim 1, further comprising computer executable instructions that, when executed, direct the computing device to present a graphical user interface to facilitate user entry of an input of the software application, a current state of the software application associated with the input, and a next state of the software application to define a transition rule of the software application.

5. One or more computer readable storage media as recited in claim 1, further comprising computer executable instructions that, when executed, direct the computing device to:
   present a graphical user interface that facilitates a user defining a transition rule of the software application and disabling the transition rule; and
   generate the model of the software application without incorporating the disabled transition rule.

6. One or more computer readable storage media as recited in claim 1, further comprising computer executable instructions that, when executed, direct the computing device to:
   evaluate a current state of the software application to determine if an input of the software application can be applied to the current state; and
   in the event that the input can be applied to the current state, write a state table entry out to a state table.

7. One or more computer readable storage media as recited in claim 1, further comprising computer executable instructions that, when executed, direct the computing device to present a graphical user interface to facilitate user entry of an operational mode of the software application, at least one modal value associated with the operational mode, and an input of the software application to define the state information.

8. One or more computer readable storage media as recited in claim 1, further comprising computer executable instructions that, when executed, direct the computing device to present a graphical user interface to define the transition information and to facilitate user entry of a current state of the software application that is associated with an input of the software application, and user entry of a next state that indicates the state of the software application after the input has been applied to the current state of the software application.

9. One or more computer readable storage media comprising computer executable instructions that, when executed, direct a computing device to:
   present a user interface that facilitates user entry of state information and transition information about a software application to be tested;
   initiate generation of a model of the software application, the model being generated from the state information and the transition information;
   select a graph traversal program that generates a test sequence of inputs for the software application, the test sequence of inputs being generated from the model of the software application; and
   select a test driver program that executes a test sequence of inputs on the software application.

10. One or more computer readable storage media comprising computer executable instructions that, when executed, direct a computing device to:
    receive state information about a software application to be tested;
    receive transition information about the software application;
    generate a model of the software application from the state information and the transition information;
    generate a test sequence of inputs for the software application with a graph traversal program, the test sequence of inputs being generated from the model of the software application; and
    execute the test sequence of inputs on the software application.

11. One or more computer readable storage media as recited in claim 10, further comprising computer executable instructions that, when executed, direct the computing device to generate the model of the software application by:
    evaluating a current state of the software application to determine if an input of the software application can be applied to the current state; and
    in the event that the input can be applied to the current state, writing a state table entry out to a state table.

* * * * *